United States Patent [19]

Saeki

[11] 3,792,199

[45] Feb. 12, 1974

[54] REPRODUCER DEVICE FOR FM STEREO MULTIPLEX SIGNALS

[75] Inventor: Yoshifumi Saeki, Tokyo, Japan

[73] Assignee: Pioneer Electronic Corporation, Tokyo, Japan

[22] Filed: Sept. 14, 1970

[21] Appl. No.: 72,086

[30] Foreign Application Priority Data

Sept. 13, 1969 Japan .............................. 44-72318

[52] U.S. Cl. .................. 179/15 BT, 325/48, 325/36

[51] Int. Cl. .............................................. H04h 5/00

[58] Field of Search. 179/15 BT, 1 G, 16 P; 325/36, 325/47, 48, 49

[56] References Cited

UNITED STATES PATENTS

| | | | |
|---|---|---|---|
| 3,290,443 | 12/1966 | Mergner | 179/15 BT |
| 3,164,676 | 1/1965 | Brunner | 179/1 G |
| 3,440,342 | 4/1969 | Beltrami | 178/5.6 |

OTHER PUBLICATIONS

Simultaneous Transmission of Two Television Sound Channels NHK Laboratories Note Feb. 1970

*Primary Examiner*—William C. Cooper
*Assistant Examiner*—Thomas D'Amico
*Attorney, Agent, or Firm*—Sughrue, Rothwell, Mion, Zinn and Macpeak

[57] ABSTRACT

A receiving and reproducing device for multiplex broadcast signals whereby a monaural and a stereo signal can be received and further a multiplex signal which contains two independent signals, for example, a Japanese language signal and another language signal can be received and selectively reproduced. When a stereo signal is received, each circuit of this device automatically operates so as to reproduce the stereo signal. When a multiplex signal other than a stereo signal is received, each circuit operates so as to reproduce a main signal or a sub-signal of the multiplex signal according to the predetermined selection.

1 Claim, 3 Drawing Figures

REPRODUCER DEVICE FOR FM STEREO MULTIPLEX SIGNALS

BACKGROUND OF THE INVENTION

This invention relates generally to a reproducer device for a broadcast signal, and more particularly to a reproducer device in which a multiplex broadcast signal, containing a right and a left signal for stereo or two independent signals, is selectively received and reproduced.

Prior art reproducer devices for a multiplex broadcast signal receive a stereo signal and separate it into a right and a left signal so as to reproduce the signal stereophonically. In a pilot-tone system of frequency modulation broadcasting, for example, the reproducer device receives a composite signal containing a main signal (or L+R), and a sub-signal (or L−R) and a pilot signal, and reproduces the left and the right signals by means of a matrix circuit in which the L+R and L−R signals are electrically added or subtracted to provide 2L and 2R signals. A pilot-tone system of the type described has been used in Japan. The system uses a 55KHz cue or pilot signal, main channel in the range of 58hz to 15KHz and a subchannel in the range of 16KHz to 47 Khz. When the reproducer device for the broadcasting system receives a monaural signal, only the main signal is reproduced, and it is not necessary to receive a sub-signal.

Recently, it has become possible to broadcast a multiplex signal containing not the left and right signals but two different independent signals. If a sound signal of a television is televised as the multiplex signal containing two languages, listeners can select whichever language they want, and if a stereo signal is televised as the multiplex signal, listeners can listen in the stereophonic program as a customary FM stereo broadcasting.

SUMMARY OF THE INVENTION

An object of the invention is to provide a reproducer device for multiplex signals wherein a main signal or a sub-signal can be singly reproduced.

Another object of the invention is to provide a reproducer device for multiplex signals wherein a main signal and a sub-signal can be reproduced as a stereophonic signal.

A further object of the invention is to provide a reproducer device for multiplex signals in which each circuit is automatically switched according to the kind of received signal. For example, when the stereo signal is received, each circuit operates so as to reproduce the stereo signal, and when the sub-signal is received, each circuit operates so as to reproduce the sub-signal, and further when the sub-signal ceases, each circuit is restored so as to reproduce the main signal.

DESCRIPTION OF THE PREFERRED EMBODIMENTS

Figures 1, 3:
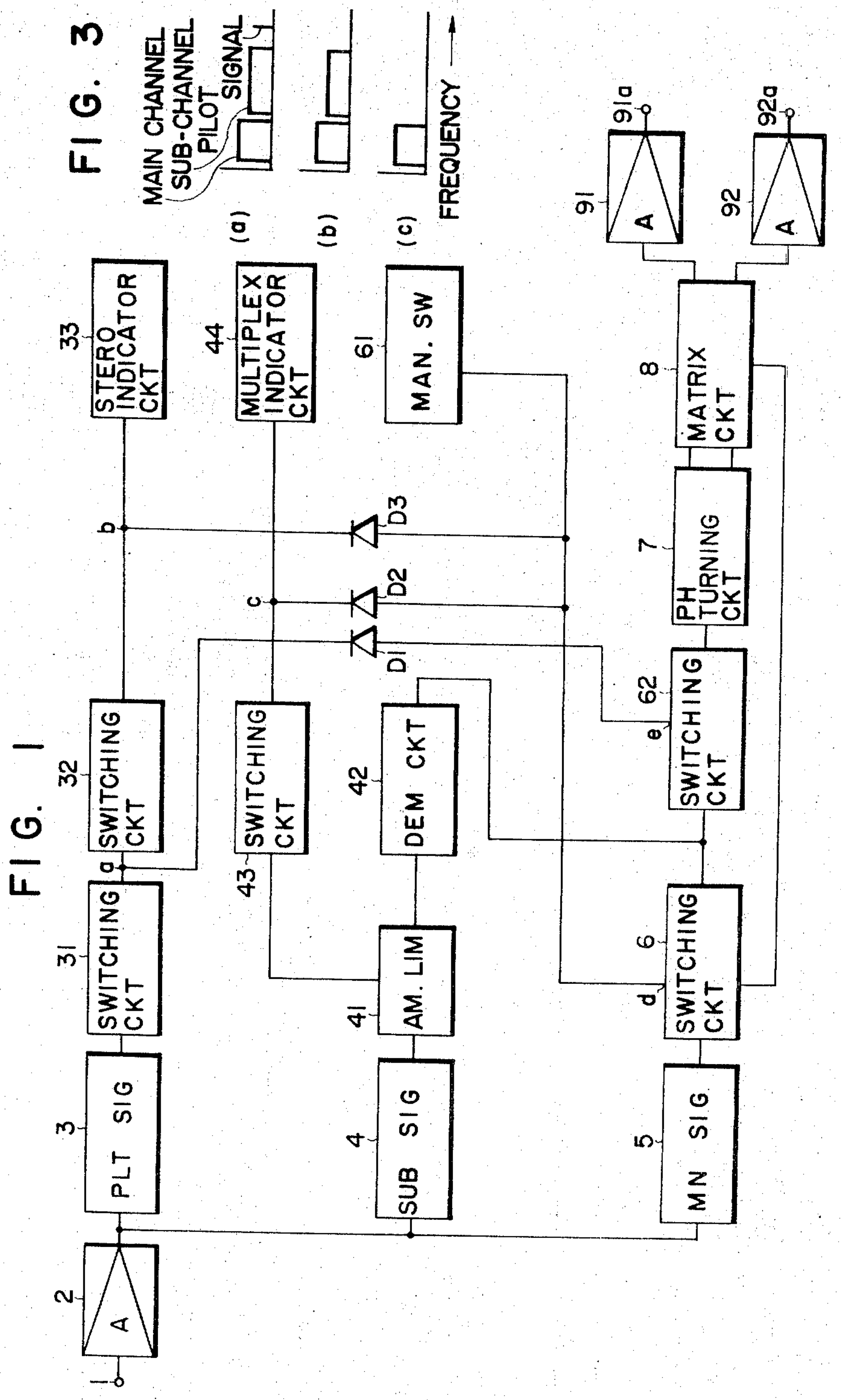
FIG. 1 is an electrical diagram, in block form, of a preferred embodiment of a reproducer device in accordance with the invention.
FIG. 3 is a graphical representation of frequency relationships of signals.

In FIG. 1, numeral 1 designates an input terminal for signals, and 2 is a pre-amplifier whereby signals coming from the input terminal 1 are amplified. A selector circuit 3 for a pilot signal, a selector circuit 4 for a sub-signal and a selector circuit 5 for a main signal separate a multiplex input signal into the pilot signal, the sub-signal and the main signal. The first switching circuit 31 is switched by the output signal of the selector circuit 3. The second switching circuit 32 is switched by the switching operation of the first switching circuit 31. A stereo indicator circuit 33 is operated by the second switching circuit and indicates whether or not a received signal is a stereo signal. An amplitude limiter 41 amplifies the output of the selector circuit 4 and limits the amplitude of the amplified signal. A demodulator circuit 42 demodulates the output of the amplitude limiter 41. The third switching circuit 43 is switched by the output signal of the amplitude limiter 41. A multiplex indicator circuit 44 is operated by the third switching circuit 43 and indicates whether or not the received signal is a multiplex signal containing the sub-signal. The fourth switching circuit 6 is controlled by the second switching circuit 32 or the third switching circuit 43 or a manual switch 61, and selects either the main signal from the selector circuit 5 or the sub-signal from the demodulator circuit 42. The fifth switching circuit 62 is operated by the first switching circuit 31 and passes the sub-signal coming from the demodulator circuit 42 only when there is the pilot signal. A phase inverter circuit 7 changes the sub-signal coming from the fifth switching circuit 62 into two signals having phase difference of 180° from each other. A matrix circuit 8 mixes the two signals coming from the phase inverter circuit 7 and the main signal coming from the fourth switching circuit 6 thereby producing the left and the right signal of the stereo signal. An amplifier 91 having an output terminal 91*a* amplifies the left signal and an amplifier 92 having an output terminal 92*a* amplifies the right signal. If a received signal is not a stereo signal, the same monaural signal is applied to output terminals 91*a* and 92*a*.

Figure 2:
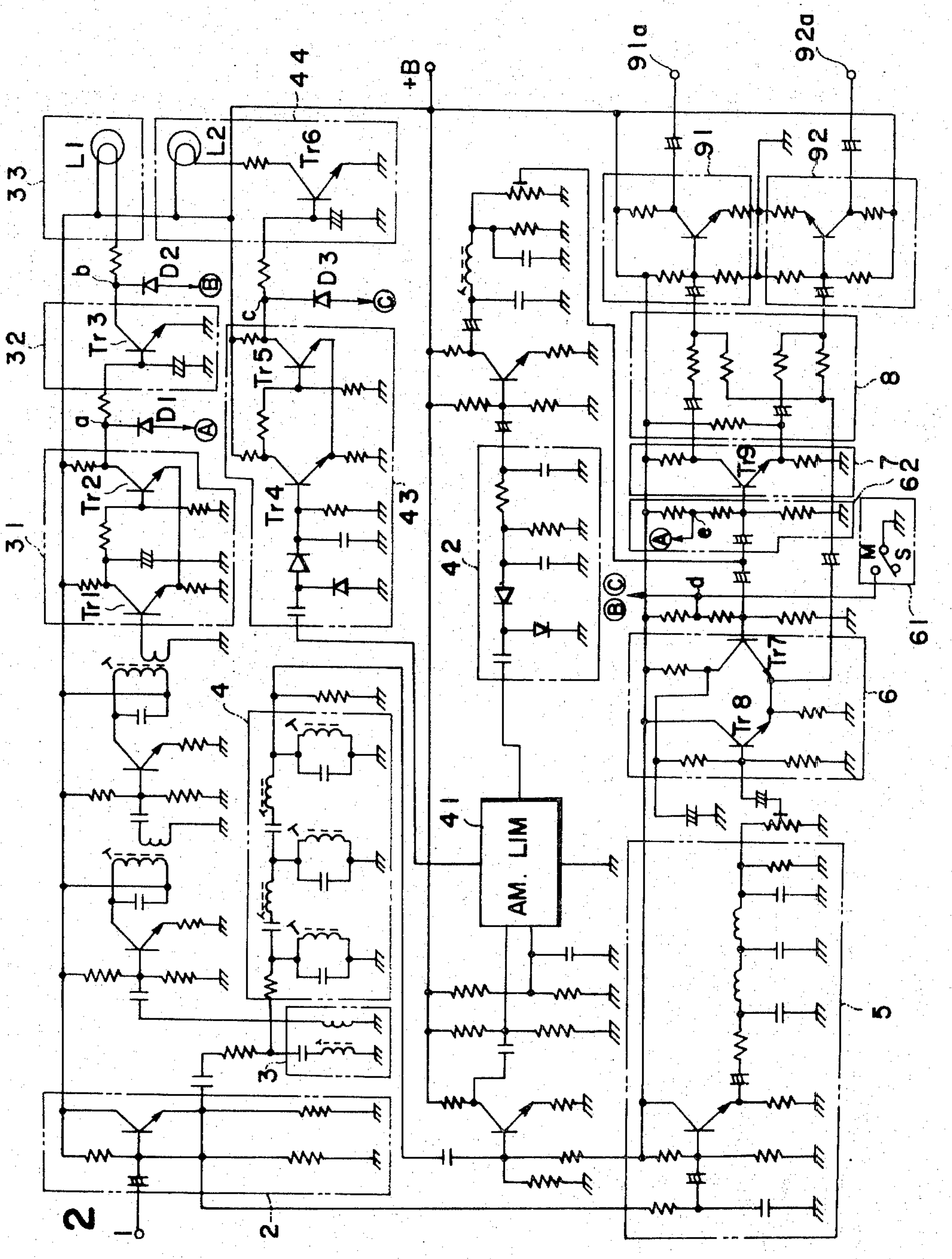
FIG. 2 is a circuit of one embodiment of FIG. 1.

The operation of the invention will be further described in detail referring to FIG. 2 wherein one of practical circuit is shown. First, the circuit operation, when a signal having a spectrum as shown in FIG. 3(*a*) is received, will be described. The received signal is amplified by the pre-amplifier 2. The pilot signal which has the highest frequency component is selected out by the selector circuit 3 for a pilot signal thereby switching transistors Tr1 and Tr2 of the first switching circuit 31. Transistors Tr1 and Tr2 form a Schmitt trigger circuit wherein the transistor Tr1 is normally OFF and the transistor Tr2 is normally ON. When the pilot signal is applied, the transistor Tr1 turns ON and the transistor Tr2 turns OFF. This results in a transistor Tr3 of the second switching circuit 32, which is normally OFF as the potential of a point "*a*" is usually low, to turn ON, resulting in the lighting of a lamp L1 of the stereo indicator circuit 33.

The sub-signal (in this case, the signal is L−R signal) is selected by the selector circuit 4 which is a band pass filter, amplified and limited by the amplitude limiter 41, and demodulated into an audible signal by the demodulator circuit 42 which is an FM detector. The output signal of the amplitude limiter 41 switches transistors Tr4 and Tr5 of the third switching circuit 43. Transistors Tr4 and Tr5 form a Schmitt trigger circuit, and transistor Tr4 is normally OFF and transistor Tr5 is normally ON. When the sub-signal comes, the transistor Tr4 turns ON and the transistor Tr5 turns OFF. A transistor Tr6, which is contained in the multiplex indicator circuit 44, is normally OFF since the potential of a point "c" is usually low, is turned ON and a lamp L2 is lighted.

The main signal (in this case, the signal is L+R signal) is selected and amplified by the selector circuit 5 which contains a low pass filter. A diode D2 is biased in the forward direction as the potential of a point "b" is low, resulting in a low potential at point "d". Therefore, transistor Tr7 turns OFF, and a transistor Tr8 turns ON as a base potential is raised by the potential of the collector of the transistor Tr7. The output signal of the selector circuit 5 is passed through the fourth switching circuit 6 and fed to the matrix circuit 8, but the sub-signal coming from the demodulator circuit 42 is not passed through the fourth switching circuit 6. The diode D1 is biased in the reverse direction since the potential of the point "a" is high, therefore, the potential of a point "e" is high. As transistor Tr9 of the phase inverter circuit 7 begins its operation, the sub-signal coming from the demodulator circuit 42 is divided into two signals, one is fed from the collector of the transistor Tr9 and the other is fed from the emitter of the transistor Tr9. The two signals have a phase differences of 180°. These two signals are fed to the matrix circuit 8 wherein the two signals, that is L—R and —(L—R), are added to the main signal L+R, and the L signal and R signal are reproduced thereby. The L signal is amplified by the amplifier 91 and fed to output terminal 91*a*, and the R signal is amplified by the amplifier 92 and fed to output terminal 92*a*.

Circuit operation will now be described when a multiplex signal is not a stereo signal but is composed with two different signals, for example, one is a Japanese language signal and another foreign language signal. The pilot signal is not necessary in such multiplex signals, therefore an input signal has a spectrum of FIG. 3(*b*). Since this is not a pilot signal, the first switching circuit 31, the second switching circuit 32 and the stereo indicator circuit 33 do not operate. The potential of the point "a" is low and that of the point "b" is high. The third switching circuit 43 is operated by the sub-signal, and the potential of the point "c" is high. The multiplex indicator circuit 44 is operated and the lamp L2 is lighted. As the potential of the point "a" is low, the diode D1 is ON. As the potential of the point "e" becomes low, the transistor Tr9 is turned OFF and the output signal of the demodulator circuit 42 cannot pass through the fifth switching circuit 62. But the potentials of the points "b" and "c" are high, so, that if the point "d" becomes high, it causes transistor Tr7 to turn ON and Tr8 to turn OFF. The fourth switching circuit 6 stops the main signal and passes only the sub-signal to the matrix circuit 8. The matrix circuit 8 receives no signal from phase inverter circuit 7, so the sub-signals having the same phase are fed into amplifiers 91 and 92, and the sub-signals are applied to output terminals 91a and 92a. When the manual switch 61 is switched from "S" to "M", the potential of the point "d" goes to ground, the transistor Tr7 turns OFF, the transistor Tr8 turns ON. The sub-signal is stopped and the main signal is fed from the output terminal 91*a* and 92*a*.

Now the circuit operation, in case that a received signal contains only a main signal, will be described. Such input signals have a spectrum of FIG. 3(*c*). As there is not a pilot signal and a sub-signal, the potential of the point "a" is low and that of the point "b" is high. The third switching circuit 43 is not operated, and the potential "c" is low. Since the potential of the point "a" is low, the point "e" is also low, and the fifth switching circuit 62 is OFF whether there is a sub-signal or not. The potential of the point "b" is high but that of the point "c" is low, therefore that of point "d" becomes low, and the transistor Tr7 turns OFF while transistor Tr8 turns ON. The main signal passes through the fourth switching circuit 6 and is applied to the output terminals 91*a* and 92*a*.

As described in detail hereinabove, the circuit of this invention operates automatically, that is, when the stereo signal is received, the circuit reproduces the stereo signal. When the received signal contains a sub-signal but no pilot signal, the circuit operates to reproduce only the sub-signal. When the received signal contains only a main signal, the circuit operates to reproduce the main signal. When the received signal contains a sub-signal and a main signal, a manual switch may be operated for listening to the main signal. The signal containing two different signals is reproduced without any cross-talk. A reliable automatic switching operation is obtained to listen to a stereo, a subsignal or a main signal.

I claim:

1. An FM-FM system for reproducing FM multiplex signals comprising a pilot signal, a sub-signal and a main signal, said system comprising a first selector means for selecting said pilot signal, a second selector means for selecting said sub-signal, a third selector means for selecting said main signal, a first switch means connected to said first selector means and responsive to the output thereof, a second switch means connected to said first switch means and responsive to the output thereof, a third switch means connected to said second selector means and responsive to the output thereof, demodulator means coupled to said second selector means for demodulating the output thereof, fourth switch means connected to said demodulator means, said second switch means, and to said third selector means for passing the output of said demodulator means when there is no output from said first selector means and for passing the output from said third selector means when said first selector means produces an output or when neither said first selector means nor said second selector means produces an output, a manual switch means connected to said fourth switch means for causing said fourth switch means to pass either the output of said demodulator means or said third selector means, a fifth switch means connected to said demodulator circuit and to said first switch means for passing the output of said demodulator circuit when said first selector means produces an output, a phase inverter means connected to said fifth switch means for receiving the output thereof and for producing therefrom two signals 180° out of phase with each other, and a matrix circuit means connected to said phase inverter means and to said fourth switch means and for producing two outputs: the first comprising the sum of one of said two 180° out of phase signals and the output of said fourth switch means, and the second comprising the sum of the other of said two 180° out of phase signals and the output of said fourth switch means.

* * * * *